United States Patent
Seder et al.

(10) Patent No.: US 6,522,770 B1
(45) Date of Patent: Feb. 18, 2003

(54) MANAGEMENT OF DOCUMENTS AND OTHER OBJECTS USING OPTICAL DEVICES

(75) Inventors: Phillip Andrew Seder, Portland; J. Scott Carr, Beaverton; Burt W. Perry; Stanley E. Graham, both of Lake Oswego; Geoffrey B. Rhoads, West Linn, all of OR (US)

(73) Assignee: Digimarc Corporation, Tualatin, OR (US)

( * ) Notice: Subject to any disclaimer, the term of this patent is extended or adjusted under 35 U.S.C. 154(b) by 157 days.

(21) Appl. No.: 09/629,401

(22) Filed: Aug. 1, 2000

Related U.S. Application Data

(63) Continuation-in-part of application No. 09/571,422, filed on May 15, 2000, and a continuation-in-part of application No. 09/343,104, filed on Jun. 26, 1999, and a continuation-in-part of application No. 09/314,648, filed on May 19, 1999.

(51) Int. Cl.[7] ................................................. G06K 9/00
(52) U.S. Cl. ........................ 382/100; 235/375; 380/54; 382/306
(58) Field of Search ............................. 382/100, 2, 112, 382/232, 140, 306; 380/54; 235/375; 399/27; 358/403, 462; 345/440; 703/1

(56) References Cited

U.S. PATENT DOCUMENTS

| | | | |
|---|---|---|---|
| 3,845,391 A | 10/1974 | Crosby | 325/164 |
| 3,984,624 A | 10/1976 | Waggener | 178/5.6 |
| 4,238,849 A | 12/1980 | Gassmann | 370/11 |
| 4,313,197 A | 1/1982 | Maxemchuk | 370/111 |
| 4,367,488 A | 1/1983 | Leventer et al. | 358/147 |
| 4,379,947 A | 4/1983 | Warner | 179/1 |
| 4,380,027 A | 4/1983 | Leventer et al. | 358/147 |
| 4,395,600 A | 7/1983 | Lundy et al. | 179/1.5 M |

(List continued on next page.)

FOREIGN PATENT DOCUMENTS

| | | |
|---|---|---|
| EP | 493091 | 7/1992 |
| JP | 8-50598 | 2/1996 |
| JP | 8050598 | 2/1996 |
| WO | WO94/27228 | 11/1994 |
| WO | WO95/14289 | 5/1995 |
| WO | WO95/20291 | 7/1995 |
| WO | WO96/27259 | 9/1996 |
| WO | WO96/36163 | 11/1996 |
| WO | WO98/20642 | 5/1998 |
| WO | WO98/24050 | 6/1998 |
| WO | WO99/34277 | 7/1999 |

OTHER PUBLICATIONS

U.S. application No. 09/074,034, Rhoads, filed May 6, 1998.
U.S. application No. 09/127,502, Rhoads, filed Jul. 31, 1998.
U.S. application No. 09/185,380, Davis et al., filed Nov. 3, 1998.
U.S. application No. 09/314,648, Rodriguez et al., filed May 19, 1999.
U.S. application No. 09/342,688, Rodriguez et al., filed Jun. 29, 1999.

(List continued on next page.)

*Primary Examiner*—Jayanti K. Patel
(74) *Attorney, Agent, or Firm*—Steven W. Stewart; Digimarc Corporation

(57) ABSTRACT

By printing documents and other objects with machine readable indicia, such as steganographic digital watermarks or barcodes, a great variety of document management functions can be enabled. The indicia can be added as part of the printing process (after document data has been output by an originating application program), such as by printer driver software, by a Postscript engine in a printer, etc. The indicia can encode data about the document, or can encode an identifier that references a database record containing such data. By showing the printed document to a computer device with a suitable optical input device (e.g., a webcam), an electronic version of the document can be recalled for editing, or other responsive action can be taken.

5 Claims, 3 Drawing Sheets

U.S. PATENT DOCUMENTS

| | | | | |
|---|---|---|---|---|
| 4,425,642 A | | 1/1984 | Moses et al. ................... | 370/76 |
| 4,528,588 A | | 7/1985 | Löfberg ........................ | 358/122 |
| 4,547,804 A | | 10/1985 | Greenberg ................... | 358/142 |
| 4,672,605 A | | 6/1987 | Hustig et al. .................. | 370/76 |
| 4,675,746 A | | 6/1987 | Tetrick et al. ............... | 358/296 |
| 4,750,173 A | | 6/1988 | Blüthgen ..................... | 370/111 |
| 4,807,031 A | | 2/1989 | Broughton et al. .......... | 358/142 |
| 4,855,827 A | | 8/1989 | Best ........................... | 358/143 |
| 4,888,798 A | | 12/1989 | Earnest ........................ | 380/4 |
| 4,908,836 A | | 3/1990 | Rushforth et al. ............. | 375/1 |
| 4,947,028 A | | 8/1990 | Gorog ......................... | 235/381 |
| 4,969,041 A | | 11/1990 | O'Grady et al. ............. | 358/142 |
| 4,977,594 A | | 12/1990 | Shear ........................... | 380/4 |
| 5,023,907 A | | 6/1991 | Johnson ....................... | 380/4 |
| 5,053,956 A | | 10/1991 | Viyella ........................ | 364/401 |
| 5,103,459 A | | 4/1992 | Gilhousen et al. ............. | 375/1 |
| 5,113,518 A | | 5/1992 | Durst .......................... | 395/550 |
| 5,138,712 A | | 8/1992 | Corbin ........................ | 395/700 |
| 5,146,457 A | | 9/1992 | Veldhuis et al. ............ | 370/111 |
| 5,187,750 A | * | 2/1993 | Behera ........................ | 382/140 |
| 5,243,423 A | | 9/1993 | DeJean et al. .............. | 358/142 |
| 5,262,860 A | | 11/1993 | Fitzpatrick ................. | 358/142 |
| 5,288,976 A | | 2/1994 | Citron ......................... | 235/375 |
| 5,304,786 A | * | 4/1994 | Pavlidis et al. ............. | 235/462 |
| 5,319,735 A | | 6/1994 | Preuss et al. ............... | 395/2.14 |
| 5,385,371 A | | 1/1995 | Izawa ........................... | 283/34 |
| 5,428,731 A | | 6/1995 | Powers ........................ | 395/154 |
| 5,463,209 A | | 10/1995 | Figh ............................ | 235/383 |
| 5,493,677 A | | 2/1996 | Balogh ........................ | 395/600 |
| 5,495,411 A | | 2/1996 | Ananda ....................... | 364/401 |
| 5,495,581 A | | 2/1996 | Tsai ............................. | 395/154 |
| 5,496,071 A | | 3/1996 | Walsh .......................... | 283/70 |
| 5,502,576 A | * | 3/1996 | Ramsay et al. .............. | 358/444 |
| 5,524,933 A | | 6/1996 | Kunt et al. ................... | 283/67 |
| 5,530,852 A | | 6/1996 | Meske ......................... | 395/600 |
| 5,548,645 A | | 8/1996 | Ananda ........................ | 380/4 |
| 5,553,143 A | | 9/1996 | Ross ............................ | 380/25 |
| 5,579,479 A | | 11/1996 | Plum .................... | 395/188.01 |
| 5,613,004 A | | 3/1997 | Cooperman ................. | 380/28 |
| 5,629,980 A | | 5/1997 | Stefik .......................... | 380/4 |
| 5,634,012 A | | 5/1997 | Stefik .......................... | 395/239 |
| 5,636,276 A | | 6/1997 | Brugger ....................... | 380/4 |
| 5,638,443 A | | 6/1997 | Stefik .......................... | 380/4 |
| 5,640,193 A | | 6/1997 | Wellner ....................... | 348/7 |
| 5,640,467 A | | 6/1997 | Yamashita et al. .......... | 382/181 |
| 5,646,997 A | | 7/1997 | Barton ........................ | 380/23 |
| 5,646,999 A | | 7/1997 | Saito ........................... | 380/25 |
| 5,652,626 A | | 7/1997 | Kawakami et al. ......... | 348/463 |
| 5,652,714 A | | 7/1997 | Peterson ..................... | 364/550 |
| 5,657,462 A | | 8/1997 | Brouwer ..................... | 395/336 |
| 5,659,164 A | | 8/1997 | Schmid ....................... | 235/375 |
| 5,663,766 A | | 9/1997 | Sizer, II ....................... | 348/473 |
| 5,665,951 A | | 9/1997 | Newman et al. ............. | 235/375 |
| 5,671,282 A | | 9/1997 | Wolff et al. ................... | 380/25 |
| 5,673,316 A | | 9/1997 | Auerbach et al. ............. | 705/51 |
| 5,680,223 A | | 10/1997 | Cooper et al. ............... | 358/403 |
| 5,687,236 A | * | 11/1997 | Moskowitz et al. .......... | 380/28 |
| 5,715,403 A | | 2/1998 | Stefik .......................... | 395/244 |
| 5,721,755 A | | 2/1998 | Powell ........................ | 382/100 |
| 5,734,119 A | | 3/1998 | France ........................ | 84/622 |
| 5,742,845 A | | 4/1998 | Wagner ....................... | 710/11 |
| 5,761,686 A | | 6/1998 | Bloomberg ................ | 707/529 |
| 5,765,152 A | | 6/1998 | Erickson ....................... | 707/9 |
| 5,774,452 A | | 6/1998 | Wolosewicz ................ | 370/212 |
| 5,778,102 A | | 7/1998 | Sandford, II et al. ........ | 382/251 |
| 5,801,687 A | | 9/1998 | Peterson ..................... | 345/302 |
| 5,804,803 A | | 9/1998 | Cragun et al. .............. | 235/375 |
| 5,809,317 A | | 9/1998 | Kogan ......................... | 395/762 |
| 5,818,441 A | | 10/1998 | Throckmorton ............ | 345/328 |
| 5,822,436 A | | 10/1998 | Rhoads ....................... | 380/54 |
| 5,828,325 A | | 10/1998 | Wolosewicz et al. ......... | 341/52 |
| 5,841,978 A | * | 11/1998 | Rhoads ....................... | 709/217 |
| 5,845,281 A | | 12/1998 | Benson .......................... | 707/9 |
| 5,848,413 A | | 12/1998 | Wolff ......................... | 707/110 |
| 5,848,424 A | | 12/1998 | Scheinkman ............... | 707/501 |
| 5,852,673 A | | 12/1998 | Young ........................ | 382/164 |
| 5,857,038 A | | 1/1999 | Owada et al. .............. | 382/284 |
| 5,866,888 A | * | 2/1999 | Bravman et al. ........... | 235/375 |
| 5,872,589 A | | 2/1999 | Morales ....................... | 348/13 |
| 5,880,453 A | * | 3/1999 | Wang et al. .......... | 235/462.01 |
| 5,892,900 A | | 4/1999 | Ginter et al. ............... | 713/200 |
| 5,893,910 A | | 4/1999 | Martineau .................... | 707/10 |
| 5,900,608 A | | 5/1999 | Iida ............................ | 235/381 |
| 5,905,248 A | | 5/1999 | Russell et al. ............. | 235/462 |
| 5,915,027 A | | 6/1999 | Cox et al. ..................... | 380/54 |
| 5,920,861 A | | 7/1999 | Hall ............................. | 707/9 |
| 5,920,878 A | | 7/1999 | DeMont ..................... | 707/513 |
| 5,926,822 A | | 7/1999 | Garman ..................... | 707/503 |
| 5,930,767 A | | 7/1999 | Reber et al. ................. | 705/26 |
| 5,932,862 A | * | 8/1999 | Hussey et al. .............. | 235/462 |
| 5,932,863 A | | 8/1999 | Rathus ................ | 235/462.15 |
| 5,933,829 A | | 8/1999 | Durst et al. ................... | 707/10 |
| 5,938,726 A | | 8/1999 | Reber et al. ................ | 709/217 |
| 5,940,595 A | | 8/1999 | Reber et al. ........... | 395/200.57 |
| 5,942,741 A | * | 8/1999 | Longacre, Jr. et al. ...... | 235/462 |
| 5,971,277 A | | 10/1999 | Cragun et al. ......... | 235/462.01 |
| 5,974,141 A | | 10/1999 | Saito ............................ | 380/4 |
| 5,978,773 A | | 11/1999 | Hudetz et al. ................ | 705/23 |
| 5,983,218 A | | 11/1999 | Syeda-Mahmood ........... | 707/3 |
| 5,991,876 A | | 11/1999 | Johnson et al. ............. | 713/200 |
| 6,052,486 A | | 4/2000 | Knowlton et al. .......... | 382/232 |
| 6,122,403 A | * | 9/2000 | Rhoads ....................... | 382/233 |
| 6,286,036 B1 | | 9/2001 | Rhoads | |
| 6,311,214 B1 | * | 10/2001 | Rhoads ....................... | 709/217 |
| 6,324,573 B1 | * | 11/2001 | Rhoads ....................... | 709/217 |
| 6,334,721 B1 | | 1/2002 | Horigane ..................... | 400/76 |

OTHER PUBLICATIONS

U.S. application No. 09/343,104, Rodriguez et al., filed Jun. 29, 1999.

U.S. application No. 09/452,021, Davis et al., filed Nov. 30, 1999.

U.S. application No. 09/503,881. Rhoads et al., filed Feb. 14, 2000.

U.S. application No. 09/571,422, Rhoads et al., filed May, 15, 2000.

U.S. application No. 09/790,332, Lofgren et al., filed Feb. 21, 2001.

60/000,442, Jun. 20, 1995, Hudetz.

Mintzer et al., "Safeguarding Digital library Contents and Users" Digital Watermarking, D–Lib Magazine, Dec. 1997: ISSN 1082–9873.

"Copyright Protection for Digital Images, Digital Fingerprinting from FBI," Highwater FBI brochure, 1995, 4 pages.

"High Water FBI Limited Presentation Image Copyright Protection Software," FBI Ltd brochure, Jul. 1995, 17 pages.

Dautzenberg, "Watermarking Images," Department of Microelectronics and Electrical Engineering, Trinity College Dublin, 47 pages, Oct. 1994.

Bruckstein, A.M.; Richardson, T.J., A holographic transform domain image watermarking method, Circuits, Systems, and Signal Processing vol. 17, No. 3, pp. 361–389, 1998. This paper includes an appendix containing and internal memo of Bell Labs, which according to the authors of the paper, was dated Sep. 1994.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Addictive Binary Data Transmission for Video Signals," Papers Presented at Conf. Of Comm. Engineering Soc. Sep. 30–Oct. 3, 1980, Technical Reports vol. 74, pp. 342–352.

Tirkel et al, "Electronic Water Mark," DICTA–93, Macquarie University, Sydney, Australia, Dec., 1993, pp. 666–673.

Kurak et al., "A Cautionary Note On Image Downgrading," 1992 IEEE, pp. 153–159.

* cited by examiner

Customer Support

Find all the information you need to start using Digimarc MediaBridge.

Frequently asked questions about Digimarc MediaBridge:
how it works, what it can do, and how to get the most out of it.

If you have questions or comments about Digimarc MediaBridge, we're here to help. Please direct your emails to Customer Care Group or call 1-877-477-9992 and ask for Digimarc MediaBridge Customer Service.

We recommend the following Intel cameras:

Intel PC Camera Pro Pack
    Intel PC Camera Pack

These cameras are approved for Digimarc MediaBridge use:

Intel PC Camera Pro Pack
    Intel PC Camera Pack
    Philips Vesta Pro (PCVC680K)
    Philips Vesta (PCVC675K)
    3Com HomeConnect - (Mac users, Click here for camera drivers)

See which cameras work with your operating system.

Fig. 2

| IDENTIFIER | TEXT EXCERPT | ASSOCIATED HYPERLINK |
|---|---|---|
| 186282A | Frequently asked questions about Digimarc MediaBridge: | http://www.digimarc.com/mediabridge/mbco_csfaq.shtml |
| 186282B | Customer Care Group | mailto:helpdesk@digimarc.com |
| 186282C | Intel PC Camera Pro Pack | http://www.intel.com/pccamera/index.htm?iid=prodinfo+video03& |
| 186282D | Intel PC Camera Pack | http://www.intel.com/pccamera/pack.htm?iid=prodinfo+video03& |
| 186282E | Click here | http://www.3com.com/client/pcd/homeconnect/pcdigital/drivers.html#b |
| 186282F | See | http://www.digimarc.com/mediabridge/mbco_cmatrix.shtml |

Fig. 3

MANAGEMENT OF DOCUMENTS AND OTHER OBJECTS USING OPTICAL DEVICES

RELATED APPLICATION DATA

The present application is a continuation-in-part of application Ser. Nos. 09/343,104, filed Jun. 29, 1999, and 09/571,422, filed May 15, 2000. This application is a continuation-in-part of Ser. No. 09/314,648, May 19, 1999.

FIELD OF THE INVENTION

The present invention relates to management of physical objects, including paper documents and computer disks.

BACKGROUND AND SUMMARY OF THE INVENTION

The parent applications disclose a document management system that is described, in part, by the following example:

An Excel spreadsheet is printed onto paper, and the paper becomes buried in a stack of clutter on an office worker's desk. Months later the spreadsheet again becomes relevant and is dug out of the stack. Changes need to be made to the data, but the file name has long-since been forgotten. A worker simply holds the dug-out page in front of a camera associated with a desktop computer. A moment later, the electronic version of the file appears on the worker's computer display.

When the page was originally printed, tiny droplets of ink or toner were distributed across the paper in a pattern so light as to be essentially unnoticeable, but which steganographically encoded the page with a plural-bit binary number (e.g., 64 bits). A database (e.g., maintained by the operating system, the Excel program, the printer driver, etc.) stored part of this number (e.g., 24 bits, termed a UID) in association with the path and file name at which the electronic version of the file was stored, the page number within the document, and other useful information (e.g., author of the file, creation date, etc.).

The steganographic encoding of the document, and the updating of the database, can be performed by the software application (e.g., Excel). This option can be selected once by the user and applied thereafter to all printed documents (e.g., by a user selection on an "Options" drop-down menu), or can be presented to the user as part of the Print dialog window and selected (or not) for each print job.

When such a printed page is later presented to the camera, the computer automatically detects the presence of the encoded data on the page, decodes same, consults the database to identify the file name/location/page corresponding to the 24-bit UID data, and opens the identified file to the correct page (e.g., after launching Excel). Voila!

Sometimes there may be several different responses that are possible or appropriate for the encoded object. In the case of a printed office document, for example, one response may be as described above—to present the electronic version of the file on a computer, ready for editing. But other responses may also be desired, such as writing an email message to the author of the printed document, with the author's email address already specified in the message address field, etc. Various ways of selecting between such options are disclosed.

The parent applications note that such systems can be effected not just with steganographic encoding (e.g., digital watermarks), but other encoding as well—e.g., bar codes.

In the discussion that follows, the present specification expands and enhances the concepts introduced in the parent applications.

BRIEF DESCRIPTION OF THE DRAWINGS

FIG. 2 shows a printed document in which embedded hyperlinks are underlined.

FIG. 3 shows portions of a database record associated with the FIG. 2 document.

DETAILED DESCRIPTION

Figure 1:
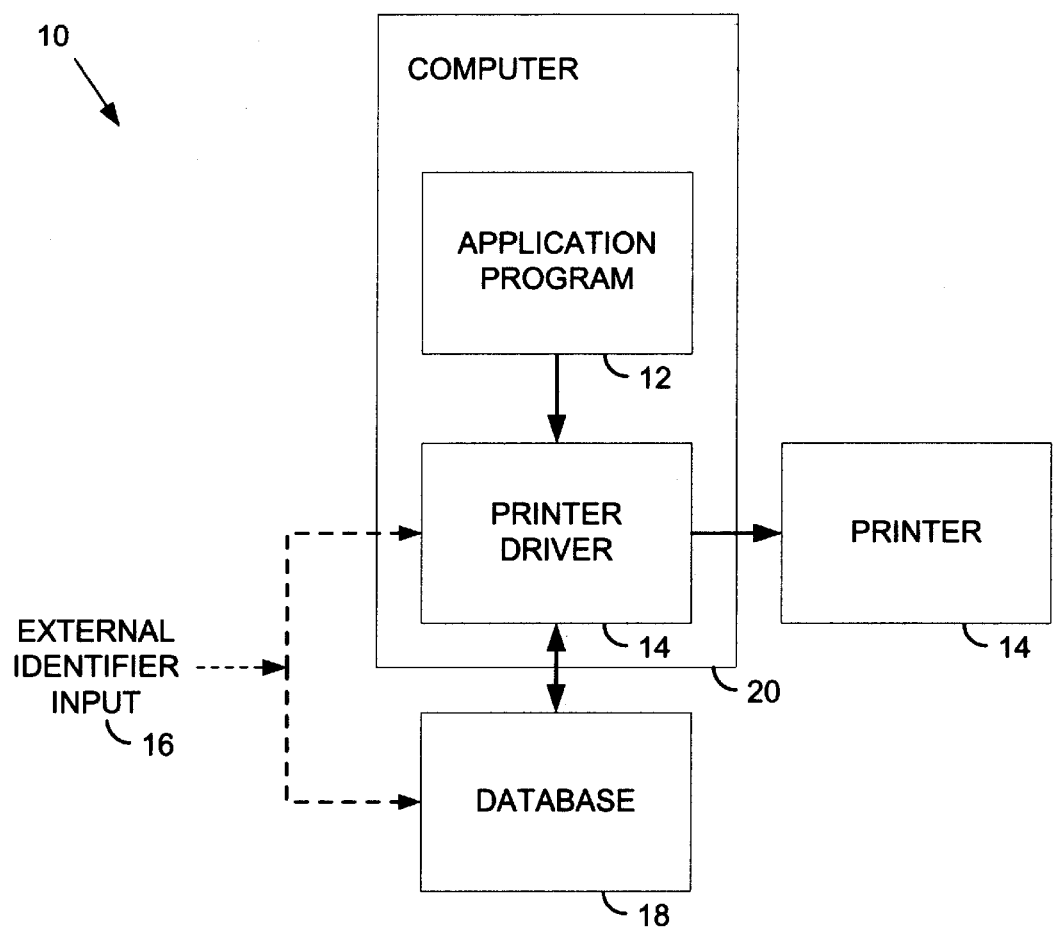
FIG. 1 shows an embodiment of a document management system according to one embodiment of the present invention.

In accordance with one embodiment of the invention, a steganographic watermark is added to a document at the time of printing. The printing may be done by a standard office printer (e.g., ink-jet, laser, etc.), or a large clustered on-demand document printer. Each document copy thus contains a mark that can be used to uniquely identify the document. Such marks can be registered in a database and used to link to information about the document.

This functionality can be achieved in various ways. For example, the application program that generated the document (e.g., Microsoft Word or Excel, Adobe Photoshop, etc.) can add the necessary markings to the output data provided to a printer driver. Or the printer driver can perform the function—adding the necessary markings to the output data provided from the application program. A microprocessor within the printer can alternatively perform the function—adding the necessary markings to the data output by the printer driver software. Or this functionality can be performed by various combinations of the foregoing. Etc.

An election to add a watermark to the printed output can be made by the user. This election can be made once, e.g., at the time of printer driver installation, and consistently applied thereafter. Or it can be made on a print-job by print-job or page by page basis, e.g., through a print dialog presented by the application program when the user requests printed output. Or the watermark can be added all the time—without any user election or involvement.

Turning to a particular example, consider the arrangement shown in FIG. 1. An application program 12, such as Microsoft Word or Excel, Adobe Photoshop, etc., sends print data to a software printer driver 14. A watermark data payload that is to be associated with the printed page is either generated internally by the printer driver, or received from an external input 16. In the depicted system this payload is a 32 bit identifier.

(The length of the payload depends on the application. In some cases, a single bit payload will suffice (e.g., it may serve as a flag to convey a single item of status information about a document—such as confidential, do-not-copy, draft, etc.) Or several such flags may be conveyed by a relatively short payload. Certain textual or numeric information may be literally encoded by the payload, such as the date and time the document was printed (e.g., a 24-bit number representing the number of elapsed minutes since Jan. 1, 2000). The foregoing are examples of direct data encoding. Indirect data encoding, such as the 32 bit identifier cited above, uses the payload as an index into another data repository in which large collections of data can be stored. This collection (sometimes called a "record") may include meta-data associated with the document, such as date, author, size, keywords, file name and storage address, footnotes or other annotations, checksum, etc. In one particular embodiment, identifiers are issued sequentially, with each document thereby assigned a unique identifier.)

By reference to the payload data, the printer driver modifies the print instructions sent to the printer so as to introduce the subtle markings associated with the corresponding steganographic watermark. In some regions of the printed page this entails depositing more ink (or toner); in other regions in may entail depositing less ink. Subtle color variations can also be introduced to effect the encoding.

If the printer driver generates the identifier data itself—rather than receiving the identifier externally—then the identifier will typically need to be stored in a database 18 (or other data structure). Accordingly, the FIG. 1 arrangement shows the printer driver providing the identifier to the database. This database may be stored at a user computer 20, at a remote computer, or may be distributed in some fashion. (If the database 18 is remote from the user computer 20, it would be prudent to encrypt the data transmitted to the database as a security precaution.) Management of the database may be through a dedicated database program (e.g., Microsoft Access), or it can be a simple table data structure or the like maintained by the printer driver itself. (If the identifier data is received externally, this data may be written to the database by the same program that generated or provided the identifier data to the printer driver.)

When, thereafter, the printed document is presented to an optical device, a software program decodes the payload from the steganographic watermark and initiates a corresponding action. If the payload represents status or textual information, the user can be advised of such information (e.g., by a corresponding screen display), or the sensing computer system can take some action based on the information (e.g., refusing to perform a reproduction operation). If the payload represents an identifier, the database 18 is queried for corresponding data, and this data is used in providing a user response. In the case earlier reviewed, the database record contains the file name and storage address of the electronic version of the printed file. The corresponding application program (e.g., Microsoft Word) is then invoked (if it is not already running), and the identified file is accessed from the specified address and opened. The document is thereby presented on the user's screen—ready for editing.

As with Internet hyperlinks, a problem can arise if a document has been moved from the address associated with that document in the database. One way of managing this is by a software program (which may be termed a daemon) that monitors movements of files within a computer's (or network's) file system, and updates any database records referring to such file locations. Another is for a software program to check all document addresses in the database, e.g., as a background process, to confirm that the referenced document is in the expected location. If a file is not found, the program can undertake an automated search for the file in other locations (e.g., checking file identity by checksum data or the like), and automatically updating database references as appropriate. If files that haven't been accessed for a prolonged period are periodically archived in compressed form on online archival storage, the software program may review recent entries to the archive list and identify the archived location of certain moved files in this fashion. Or the program can simply report missing files to the user so that the user can manually identify a new file location to the database. If a missing file cannot be located, the date of its disappearance can be written into the database record so that, if the document is later needed, the date might be available to help investigate the document's disappearance. Yet another approach that obviates the problem of moved files is to make an archival copy of each file, at the time of printing, in database 18.

In certain applications involving confidential or otherwise secure documents, access to some or all of the stored data may be restricted. In such case, access may be denied unless the user demonstrates suitable authority, e.g., by a password (which may have been earlier entered, such as a network or login password), or by providing some other security token. The token may take the form of biometric identity data, such as voice-print, fingerprint, retinal scan, etc., or may take another form.

In some embodiments, showing the printed document to the optical sensor may cause the computer to present a variety of information, including menu options, to the user. One of the menu options may be to recall the electronic version of the document for editing, as just-described. Other menu options may permit review, or action, based on the associated meta-data.

Increasingly, printed documents include reference to on-line resources—most commonly Internet web pages but sometimes PDF documents, audio or video clips, multimedia presentations, locally-stored files, etc. Microsoft Word and other programs include provision for associating links with text. In Word, this is done by highlighting an excerpt of text, selecting Hyperlink from the Insert menu, and then specifying the path (electronic address) and file (object name) to be associated with that text. Word responds by changing the appearance of the text (e.g., by underlining, and changing color), and embedding the specified link in the electronic version of the document. Such a document is shown in FIG. 2.

When the document is printed, such links can be sensed and stored in a database record associated with that document, and thereafter shown to the user when the printed document is presented to an optical input device.

In one such embodiment, the printer driver monitors print data, looking for text having formatting that is characteristic of an embedded link (e.g., blue text, underlined). Additionally, the printer driver can look for text conforming to standardized addressing protocols (e.g., text beginning with "http:\/\/ . . . " or "ftp:\/\/ . . . " or "www . . . ") When such text is found, the printer driver can store the corresponding link in the database 18 in association with an identifier for that document.

In the case of an explicit address (e.g., "http:\/\/ . . . "), the address text itself is copied into the database. In the case of characteristically-formatted text (signifying an embedded link), the printer driver can query the application program that sent the output for printing, to determine the link address associated with each such excerpt of text. These links are stored in the database, together with the text excerpts to which they correspond. (Again, the printer driver inserts at least one steganographic watermark in the printed output—serving to identify the document.) Database excerpts corresponding to the FIG. 2 document, are shown in FIG. 3. (In this example, the document identifier is 186282.)

As in the embodiment detailed earlier, when this printed page is later shown to an optical sensor, decoder software reads a document identifier from the watermark payload and uses the identifier to access one or more database records corresponding to the document. If the record(s) includes one or more links, these can be displayed on the computer screen—available for the user to click and follow. By such arrangement, associated on-line resources are made readily available when reviewing paper documents.

The printer driver's monitoring needn't be limited to on-line resource references. The print data can be monitored for various other types of information, and these other items of information can be stored in the database. One example is document titles, or headings. These can be identified in the printed output by formatting, e.g., set apart from surrounding text by font size, print attribute (bold, underlined, italics), style, or set-apart on a line to themselves—not ending in a period, etc. If such information is captured at print time and stored in the database 18 in association with the document identifier, the database can serve as an index of sorts to the document contents. The database can later be searched for words or phrases of interest, and documents matching the query can thereby be identified. In some cases, every word in a document (except common noise words) can be logged in a corresponding database record, thereby generating—in real time—an index or table of contents to all documents printed by a given printer or printer driver.

In some applications, the watermark with which the printed document is encoded may be fragile. That is, the watermark may be designed (e.g., by low strength) not to survive expected corruption mechanisms (e.g., the scanning and printing associated with photocopying, compression and decompression associated with JPEG electronic document storage, etc.). If such a mark is not found in a later-encountered document, then the document can be inferred to be a reproduction rather than the original.

Such a frail watermark can be in addition to a robust watermark—one designed to withstand expected corruption mechanisms. Only if both watermarks are detected in scan data from an object is the object inferred to be an original. Equipment processing the scanned document data can respond differently depending on whether the document is inferred to be an original or a copy, e.g., permitting or disabling certain operations.

In some embodiments it may be desirable for the user to identify himself or herself to the system—preferably in a non-repudiable way (e.g., password or other security token)—when the document is serialized or otherwise assigned an identifier. The database 18 can then log this person's identity in association with that print-out, in case this fact later becomes an issue. Relatedly, it may be desirable for the person who printed the document to specify the intended recipient(s). This data, too, can be stored in the database in association with the identifier that is watermarked in the printed document. If both measures are employed, then when a document is presented to a camera, the responding system can identify both the user who printed the document, and the intended recipient.

Relatedly, digital signature technology can be employed in conjunction with printed documents. As is familiar to those skilled in the art, digital signatures generally involve applying a hash function or the like to a document file, yielding a signature that is stored for later use. If the document file is thereafter changed, even by a single bit, it will no longer yield the same hashed output, or digital signature.

In the present context, the digital signature generated from an electronic document can be encoded in a printed document as the payload of an embedded watermark, or can be included in a database record identified by the watermark. If the printed document is thereafter shown to a camera, and an electronic version of the document is retrieved from storage, the signature of the retrieved file can be checked against the signature as represented in the watermark or as stored in the database record. If the signatures don't match, the electronic version of the document is known to have been altered.

Checksums derived from the electronic version of a document can be used in similar fashion to digital signatures.

Still another option is to encrypt an electronic version of a file, and encode an encoding key in a watermark in the printed document (or in a database record identified by the watermark). The person who encrypted the document knows the key and can open the electronic file. But third parties cannot open the electronic version of the document, unless they have custody of a printed version of the document. (This is an application where a fragile watermark would be beneficial, so that custody of a photocopy would not be sufficient to gain access to the electronic file.)

Similarly, printed documents may convey (or may point to database records containing) encryption keys permitting electronic access to unrelated documents.

It will be recognized that public key encryption, as well as private key encryption, can be used in certain of the foregoing contexts.

Techniques like those reviewed above in connection with office document can be applied to other objects as well. A "document" can thus be any object with printing, such as packaging.

Consider a catalog for a data storage medium, such as a diskette, disk, tape, CD, or DVD. Files can be copied onto the medium, and an electronic directory listing can be generated (e.g., by using the DIR function of DOS, or the counterpart functions provided in Microsoft Windows and other operating systems). If desired, the directory listing can be annotated by a user, e.g., by adding descriptive information.

This listing is stored in a data structure (e.g., a table, database, etc.) in association with index data. This index data is encoded in a watermark or other machine-readable indicia and printed on a label that is applied to the medium. (Additional data can also be printed on the label in human-intelligible form, such a text giving the date the diskette was labeled, the proprietor of the disk, a descriptive name or summary of disk contents, etc.)

By holding such a labeled disk to a webcam, video camera, optical mouse, or other optical input device, a listing of the disk's contents can rapidly be displayed. (As is now familiar, the optical input device provides image data corresponding to the label to a watermark detector. The watermark payload that is output from the watermark detector is used to index the data structure, permitting access to the corresponding directory listing. This listing is then presented on the computer screen for display.)

The user may be invited to specify certain search parameters, such as author, file date, file name, etc. Only files in the directory listing meeting the specified criteria can then be displayed. If a particular file name is specified, the user can hold diskettes up to the webcam in rapid succession, permitting dozens of diskettes to be surveyed in a minute or so, looking for the desired diskette.

The display presented to the user may include content listings of a collection of disks—not just the disk presented to the webcam. For example, presentation of a 3¼ inch diskette to the webcam may prompt a listing of all 3¼ inch diskette contents contained in the data structure, or all such disks labeled on the same date as the diskette presented by the user to the webcam (in both cases, with the contents of the user-presented diskette listed first). If the file sought is not cataloged as being on the first-listed diskette list, a Search or Find function can be executed on the listing to identify another diskette on which a desired file is stored. (The identification of like-media can be effected by selecting index identifiers from different ranges for different media. Thus 3¼ inch diskettes may have identifiers in one range, CDs may have identifiers in another, etc.)

The data structure may be posted to a shared resource on a network, so that this functionality can be effected on an enterprise-wide basis, encompassing large collections of files stored on diverse media.

The arrangement just detailed can be adapted for use in other contexts, to provide electronic listing of data associated with diverse physical objects From the foregoing, it will be recognized that embodiments according to the present invention permit data about an object to be accessed simply by showing the object to a webcam or the like.

Having described and illustrated the principles of the invention with reference to illustrative embodiments, it should be recognized that the invention is not so limited.

For example, while the detailed embodiments were described as employing steganographic digital watermarks, the same principles can likewise be utilized in conjunction with other marking techniques, including 1D and 2D bar codes, data glyphs, OCR, magnetic ink, etc.

Essentially any digital watermarking technology can be used in the described embodiments. One particular technology is detailed in the present assignee's patent application 09/503,881, filed Feb. 14, 2000, and in other references cited herein. Those skilled in the watermarking art are familiar with a great number of particular watermarking techniques.

In some cases, printing is not required to effect a digital watermark. For example, the watermarking can be effected by texturing, e.g., as disclosed in the present assignee's patent 5,822,436.

While the invention was particularly described with reference to an implementation involving a Windows printer driver, other forms of implementation are possible. Consider, for example, Adobe Postscript—a popular page description language implemented in many office printers. Watermarking may be included as an intrinsic feature of a Postscript printer engine (or any page description lanaguage). As part of printing a document, any embedded links could be registered in a suitable database 18, and the printing commands could be modified to include the appropriate ID with the setup for each page. Addition of a tint to effect watermarking could be provided when the document is converted by the engine from text to ink/toner/dye. A further advantage here is that the printer itself could have certain meta-data associated with it that is conveyed in the watermark or stored in a database record to which the watermark points (e.g., data specifying that the document was printed on a HP LaserJet 8000, with a network name of "XYZ," having port address of \\Cobra\LGL-HP8000, from a print job originated by user BCONWELL, etc., etc.). And the embedding process may be tuned by the vendor implementing the Postscript engine on their platform for optimal performance.

The illustration of the invention in the context of office documents and diskettes should not be taken as limiting its utility. To name but one other application, blueprints and other construction drawings can be encoded with a watermark. Again, the watermark can directly encode meta data, or can point to a data structure where such further information is stored.

One of many applications of such information is to ensure that a contractor is working from the latest revision of a drawing. A camera-equipped cell phone, or wireless palmtop computer with imaging capability, can be used by the contractor to acquire image data from the drawing, decode the embedded watermark ID, query a remote database for the latest revision number of that drawing, and present the latest revision number to the contractor. The contractor can check the number thus-obtained with the revision number printed in the title block of the drawing. If they match, the contractor is assured that the drawing depicts the latest information. (Blueprints and construction diagrams are forgiving media—the watermark needn't be invisible. The strength of the watermark can thus be increased to the point that a pebbling or grainy effect appears on the background of a drawing without reducing the drawing's functionality for its intended use.)

While the invention was described with reference to certain functionality implemented in software, this is not essential. Hardware, of a combination of hardware and software can be used in other embodiments. Likewise, the form of optical detector is not crucial. 2D sensor arrays, such as CCD and CMOS cameras (still or video) can be employed. So, too, can 1D sensor arrays, such as are conventionally found in scanners. Single photosensor systems, such as laser diodes with photodiodes can also be used.

The foregoing techniques can be employed in conjunction with teachings of various of the present assignee's co-pending applications, including 09/074,034 (filed May 6, 1998), 09/127,502 (filed Jul. 31, 1998), 09/185,380 (filed Nov. 3, 1998), and the parent application cited above. For example, the '034 and '502 applications disclose arrangements for watermarking blank paper stock, the principles of which can be employed to mark printed output.

To provide a comprehensive disclosure without unduly lengthening this specification, applicants incorporate by reference the patents and applications cited above.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method of electronic management of paper documents, comprising:

presenting a paper sheet to an optical sensor, the paper sheet having an optically-detectable digital watermark thereon, said digital watermark being machine-readable, but not generally intelligible to human viewers thereof, the optical sensor producing scan data;

decoding the scan data to produce binary data corresponding to said digital watermark;

accessing a data store using at least a portion of said binary data; and obtaining from said data store an electronic address at which an electronic version of said paper sheet is stored.

2. The method of claim 1 that further includes:

determining an application program suitable for opening said electronic version;

opening said electronic version with said application program; and displaying said electronic version on a computer screen.

3. The method of claim 1 wherein the digital watermark is formed by ink-jet printing.

4. The method of claim 1 wherein the electronic address was stored in said data store at the time said paper sheet was printed.

5. The method of claim 1 wherein the optical sensor comprises an array of plural image photosensor elements.

* * * * *

UNITED STATES PATENT AND TRADEMARK OFFICE
CERTIFICATE OF CORRECTION

PATENT NO.    : 6,522,770 B1
DATED         : February 18, 2003
INVENTOR(S)   : Seder et al.

It is certified that error appears in the above-identified patent and that said Letters Patent is hereby corrected as shown below:

Title page,
Item [75], Inventors, delete "Stanley E. Graham"
Item [56], U.S. PATENT DOCUMENTS, change "5,721,755" to -- 5,721,788 --.
OTHER PUBLICATIONS, change "09/790,332 to -- 09/790,322 --; and change "Addictive" to -- Additive --.

Column 1,
Lines 8-9, delete "This application is a continuation-in-part of Ser. No. 09/314,648, May 19, 1999."

Column 7,
Line 36, change "lanaguage" to -- language --.

Signed and Sealed this

Fifth Day of August, 2003

JAMES E. ROGAN
*Director of the United States Patent and Trademark Office*